US010565661B2

(12) United States Patent
Adams et al.

(10) Patent No.: US 10,565,661 B2
(45) Date of Patent: Feb. 18, 2020

(54) GENERATING SPONSORED STORY UNITS INCLUDING RELATED POSTS AND INPUT ELEMENTS

(75) Inventors: Paul Adams, San Francisco, CA (US); Carol Chia-Fan Pai, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 948 days.

(21) Appl. No.: 13/348,489

(22) Filed: Jan. 11, 2012

(65) Prior Publication Data
US 2013/0179504 A1    Jul. 11, 2013

(51) Int. Cl.
*G06F 15/16* (2006.01)
*G06Q 50/00* (2012.01)
(Continued)

(52) U.S. Cl.
CPC ............. *G06Q 50/01* (2013.01); *G06Q 30/02* (2013.01); *G06Q 30/0201* (2013.01);
(Continued)

(58) Field of Classification Search
CPC .... G06Q 50/01; G06Q 30/02; G06Q 30/0201; G06Q 30/0269; G06Q 30/0251;
(Continued)

(56) References Cited

U.S. PATENT DOCUMENTS 8,799,068 B2 *  8/2014  Kendall ................. G06Q 30/02
705/14.4

2008/0114639 A1 *  5/2008  Meek ..................... G06Q 30/02
705/14.41

(Continued)

FOREIGN PATENT DOCUMENTS

JP    2007-141051 A    6/2007
JP    2011-503701 A    1/2011
(Continued)

OTHER PUBLICATIONS

S. Thomaidou and M. Vazirgiannis, "Multiword Keyword Recommendation System for Online Advertising," 2011 International Conference on Advances in Social Networks Analysis and Mining, Kaohsiung, 2011, pp. 423-427. (Year: 2011).*

(Continued)

*Primary Examiner* — Taylor A Elfervig
(74) *Attorney, Agent, or Firm* — Fenwick & West LLP (57) ABSTRACT

A viewing user is provided with sponsored story units when accessing content associated with a social networking system. The sponsored story units include a sponsored story describing an interaction and one or more related posts. The sponsored story may describe an action of another user connected to the viewing user who has interacted with a social networking object. The one or more related posts may include content associated with the social networking object involved in the interaction described by the sponsored story. The sponsored story unit can optionally include an input element with which the viewing user can interact. The information received from the viewing user via the input element can be used to generate additional sponsored story units to the viewing user's friends.

22 Claims, 4 Drawing Sheets

(51) Int. Cl.
*G06Q 30/02* (2012.01)
*H04L 29/08* (2006.01)
*H04L 12/58* (2006.01)

(52) U.S. Cl.
CPC ..... *G06Q 30/0241* (2013.01); *G06Q 30/0251* (2013.01); *G06Q 30/0269* (2013.01); *G06Q 30/0276* (2013.01); *G06Q 30/0277* (2013.01); *G06Q 30/0282* (2013.01); *H04L 51/32* (2013.01); *H04L 67/22* (2013.01); *H04L 67/306* (2013.01)

(58) Field of Classification Search
CPC ........... G06Q 30/0282; G06Q 30/0277; G06Q 30/0276; G06Q 30/024; H04L 67/306; H04L 51/32; H04L 67/22; H04L 12/588; G06F 17/30867; G06F 17/30554
USPC .............................................. 709/204; 707/3
See application file for complete search history.

(56) References Cited

U.S. PATENT DOCUMENTS

| | | | | |
|---|---|---|---|---|
| 2009/0119167 | A1* | 5/2009 | Kendall | G06Q 30/02 705/14.17 |
| 2009/0282002 | A1* | 11/2009 | Reeder et al. | 707/3 |
| 2009/0307082 | A1* | 12/2009 | Raghunathan | G06Q 30/02 705/14.44 |
| 2010/0217645 | A1* | 8/2010 | Jin | G06Q 10/10 705/14.44 |
| 2010/0223119 | A1 | 9/2010 | Klish | |
| 2010/0228582 | A1 | 9/2010 | King et al. | |
| 2010/0228614 | A1* | 9/2010 | Zhang | G06Q 10/10 705/14.16 |
| 2010/0332330 | A1 | 12/2010 | Goel et al. | |
| 2011/0153414 | A1* | 6/2011 | Elvekrog | G06Q 30/02 705/14.43 |
| 2011/0153421 | A1 | 6/2011 | Novikov et al. | |
| 2011/0231240 | A1* | 9/2011 | Schoen | G06Q 30/0242 705/14.41 |
| 2011/0258042 | A1 | 10/2011 | Purvy et al. | |
| 2012/0166274 | A1* | 6/2012 | Krishnamoorthy | G06Q 30/0251 705/14.49 |
| 2013/0191521 | A1* | 7/2013 | Kuzmin | G06Q 30/0251 709/223 |

FOREIGN PATENT DOCUMENTS

| | | |
|---|---|---|
| JP | 2011-191911 A | 9/2011 |
| WO | WO 2009/061616 A1 | 5/2009 |
| WO | WO 2011/078975 A1 | 6/2011 |
| WO | WO 2011/125846 A1 | 10/2011 |
| WO | WO 2011/133403 A1 | 10/2011 |

OTHER PUBLICATIONS

P. M. Zadeh and M. S. Moshkenani, "Mining Social Network for Semantic Advertisement," 2008 Third International Conference on Convergence and Hybrid Information Technology, Busan, 2008, pp. 611-618. (Year: 2008).*

PCT International Search Report and Written Opinion, PCT Application No. PCT/US2013/020880, dated Apr. 26, 2013, ten pages.

Canadian Intellectual Property Office, Office Action, Canadian Patent Application No. 2,857,350, dated Sep. 16, 2015, two pages.

Canadian Intellectual Property Office, Office Action, Canadian Patent Application No. 2,857,350, dated Sep. 9, 2016, three pages.

Japan Patent Office, Office Action, Japanese Patent Application No. 2014-552269, dated Jan. 24, 2017, six pages.

Australian Government, IP Australia, Examination report No. 1 for standard patent application, Australian Patent Application No. 2013208061, dated Apr. 11, 2017, three pages.

Japanese Patent Office, Office Action, Japanese Patent Application No. 2017-137100, dated Jun. 26, 2018, twelve pages.

* cited by examiner

GENERATING SPONSORED STORY UNITS INCLUDING RELATED POSTS AND INPUT ELEMENTS

BACKGROUND

This invention generally pertains to social networking, and more specifically to generating sponsored story units that include related posts and, optionally, input elements.

Social networks, or social utilities that track and enable connections between users (including people, businesses, and other entities), have become prevalent in recent years. In particular, social networking systems allow users to communicate information more efficiently. For example, a user may post contact information, background information, job information, hobbies, and/or other user-specific data to a location associated with the user on a social networking system. Other users can then review the posted data by browsing user profiles or searching for profiles including specific data. The social networking systems also allow users to associate themselves with other users, thus creating a web of connections among the users of the social networking system. These connections among the users can be exploited by the social networking system to offer more relevant information to each user in view of the users' own stated interests.

Social networking systems typically incorporate a system for connecting users to content that is most likely to be relevant to each user. For example, users may be grouped according to one or more common attributes in their profiles, such as geographic location, employer, job type, age, music preferences, interests, or other attributes. Users of the social networking system or external parties can then use these groups to customize or target information delivery so that information that might be of particular interest to a group can be communicated to that group.

Advertisers have attempted to leverage this information about members by targeting their ads to members whose interests best align with the ads. For example, a social networking system may display banner ads for a concert to members who include an affinity for the performing band in their social networking system profile and live near a concert venue where that band might be performing. However, these attempts are no different than targeting of ads that exist in many other contexts. Advertisers have not yet been able to exploit the relationships and connections among members of a social networking system in a meaningful way to increase user engagement with an advertisement, advertised product, or brand.

SUMMARY

Embodiments of the invention provide sponsored story units to a viewing user, where the sponsored story unit includes a sponsored story and one or more related posts. The sponsored story may describe an interaction between a user connected to the viewing user and a social networking object. For example, if a viewing user is connected to another user who has "liked" a company's fan page, the sponsored story unit provided to the viewing user may include a sponsored story indicating that the other user has "liked" the page. The one or more related posts of the sponsored story unit may include content associated with the social networking object with which the other user has interacted. Referring to the previous example, the sponsored story unit may further include a comment or review previously posted by a user to the fan page. The sponsored story unit can moreover optionally include an input element with which the viewing user can interact. The viewing user can use the input element to provide, for example, a comment discussing his or her opinion of the story.

By including related posts and an input element in a sponsored story unit, embodiments can improve the effectiveness of the story. More specifically, the related posts can provide reasons for and/or the context behind the sponsored story included in a sponsored story unit. The optionally included input element can furthermore provide an additional avenue for which a viewing user can interact with the sponsored story unit. In providing related posts and an input element, a viewing user may more likely take interest in and/or interact with the sponsored story unit. The information received via the input elements can additionally enable the viral distribution of sponsored story units. More specifically, the information can be leveraged to provide corresponding sponsored story units to those users connected to the viewing user.

In one embodiment, a social networking system generates a sponsored story unit for display to a viewing user when the viewing user requests content (e.g., a web page) with which a sponsored story unit is to be served. After receiving the content request, the social networking system indentifies one or more interactions performed by the viewing user's friends. The social networking system then selects a story request to serve as the basis for the sponsored story unit, where the story request specifies an interaction that corresponds to an interaction performed by at least one of the viewing user's friends. The story request can be selected from a set of story requests previously received from, for example, advertisers. Upon selecting the story request, the social networking system identifies one or more candidate posts, where each candidate post is associated with the social networking object involved in the interaction specified by the selected story request. For example, a selected story request may specify an interaction involving a particular company's fan page. The one or more identified candidate posts can be those comments, reviews, descriptions, etc. that have been posted to the fan page. After identifying the candidate posts, the social networking system selects at least one candidate post to be featured in the sponsored story unit. The sponsored story unit can further include an input element, such as a text box, dropdown menu, etc. The input element can enable a user to interact with the sponsored story unit.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the system. In use, users join the social networking system and then add connections to a number of other users to whom they desire to be connected. As used herein, the term "friend" refers to any other user to whom a user has formed a connection, association, or relationship via the system. Connections may be added explicitly by a user, for example, the user may select a particular other user to be a friend, or may be automatically created by the social networking site based on common characteristics of the users (e.g., users who are alumni of the same educational institution). Connections in social networking systems are usually in both directions, but need not be, so the terms "user" and "friend" depend on the frame of reference. For example, if Bob and Joe are both users and connected to each other in the system, Bob and Joe are also each other's friends. The connection between users may be a direct connection; however, some embodiments of a social networking system allow the connection to be indirect via one or more levels of connections. Also, the term friend need not require that users actually be friends in real life, (which would generally be the case when one of the users is a business or other entity); it simply implies a connection in the social networking system.

In addition to interactions with other users, the social networking system provides users with the ability to interact with various types of social networking objects supported by the system. A social networking object can represent a variety of things, including, without limitation, profiles, applications (e.g., games playable within the social networking system), events (e.g., a page representative of a concert that users may attend), groups (e.g., a page to which user may belong), entity based pages or hubs (e.g., a page constituting a particular entity's presence on the social networking system), locations associated with a user (e.g., "Palo Alto, Calif., USA"), advertisements (e.g., a page including advertising content), user-generated content items (e.g., user posts), representations of physical or digital items, concepts, etc. A user can interact with a social networking object by associating with the object or interacting with the object. For example, a user can interact with an object by joining a group, attending an event, checking-in to a location, becoming a fan of an organization's fan page, "liking" a fan page, posting to a fan page, etc. These are just a few examples of the objects upon which a user may act on in a social networking system, and many others are possible. A user interaction can also include an item of user generated content. For example, a user can interact with a company's fan page by posting on the page. The post can include a user generated comment providing the user's opinion of the company's products.

In one embodiment, a social networking system provides, for display, a sponsored story unit to a viewing user. The sponsored story unit can include a sponsored story. The included sponsored story can describe the interactions between one or more of the viewing user's friends and a social networking object. For instance, a sponsored story can report that a friend of the viewing user has "liked" a social networking object, commented on the object, reviewed the object, asked a question regarding the object, associated text or media with the object, and/or the like.

The sponsored story unit can additionally include at least one related post associated with the social networking object involved in the interaction described by the sponsored story. For example, the viewing user's friend may have "liked" the fan page of a company. A post related to the fan page may be a comment associated with the page. A post can become associated with the social networking object in any suitable manner. For example, a post can become associated with a social networking object by being posted to or otherwise connected with the object. For instance, a user may associate a post with a company's fan page by publishing the post to the fan page. A post can further be of any type supported by the social networking system. For instance, the post can be a comment, a note, a status update, a question, a review, page or profile content (e.g., the "about information" for a page, media uploaded to the page), a general posting (e.g., a general posting of text or media, etc.), and/or the like. A post can additionally include any suitable types of content, including text, images, video, audio, links, applications, and/or the like. For example, a post can include a text-based comment, an audio description of a product, and a video clip demonstrating the product.

A post included in the sponsored story unit can moreover be generated by any user of the social networking system. For example, the post can be generated by the viewing user's friend whose interaction is to be reported by the sponsored story, or by other users, such as another friend of the viewing user, a user who is not friends with the viewing user, an advertiser, an entity that owns or manages the social networking object, etc. For instance, a sponsored story may include information indicating that a viewing user's friend has "liked" the fan page of a particular online retailer. The sponsored story unit may include a comment to the fan page posted by a different friend of the viewing user, a comment posted by a user who is not friends with the viewing user, and a video clip uploaded by the online retailer.

By including related posts in a sponsored story unit, the social networking system enables a viewing user to better understand the reasons for and/or the context behind his or her friend's interaction with the object. For example, a user's friend might "like" the fan page of an automobile company. The sponsored story unit, by including the comments of other users, may enable the viewing user to become better informed as to a possible reason his or her friend has "liked" the page. In doing so, the viewing user may become more interested in and more likely to interact with the sponsored story unit.

In one embodiment, the sponsored story unit can further include an input element with which the viewing user can interact. In particular, the input element can provide a means by which the viewing user can post a comment and/or other content to the sponsored story unit. By allowing a viewing user to interact with a sponsored story unit via an input element, the social networking system can make it more likely that the viewing user engages with the sponsored story unit. In addition, the interaction captured via the input element can be used to virally distribute sponsored story units to other users. More specifically, the viewing user's interaction with the input element of a sponsored story unit can be reported in sponsored story units to the viewing user's friends. The viewing user's friends who interact with input elements in the sponsored story units presented to them can accordingly have their interactions reported in sponsored story units to their friends, and so on.

Figure 1:
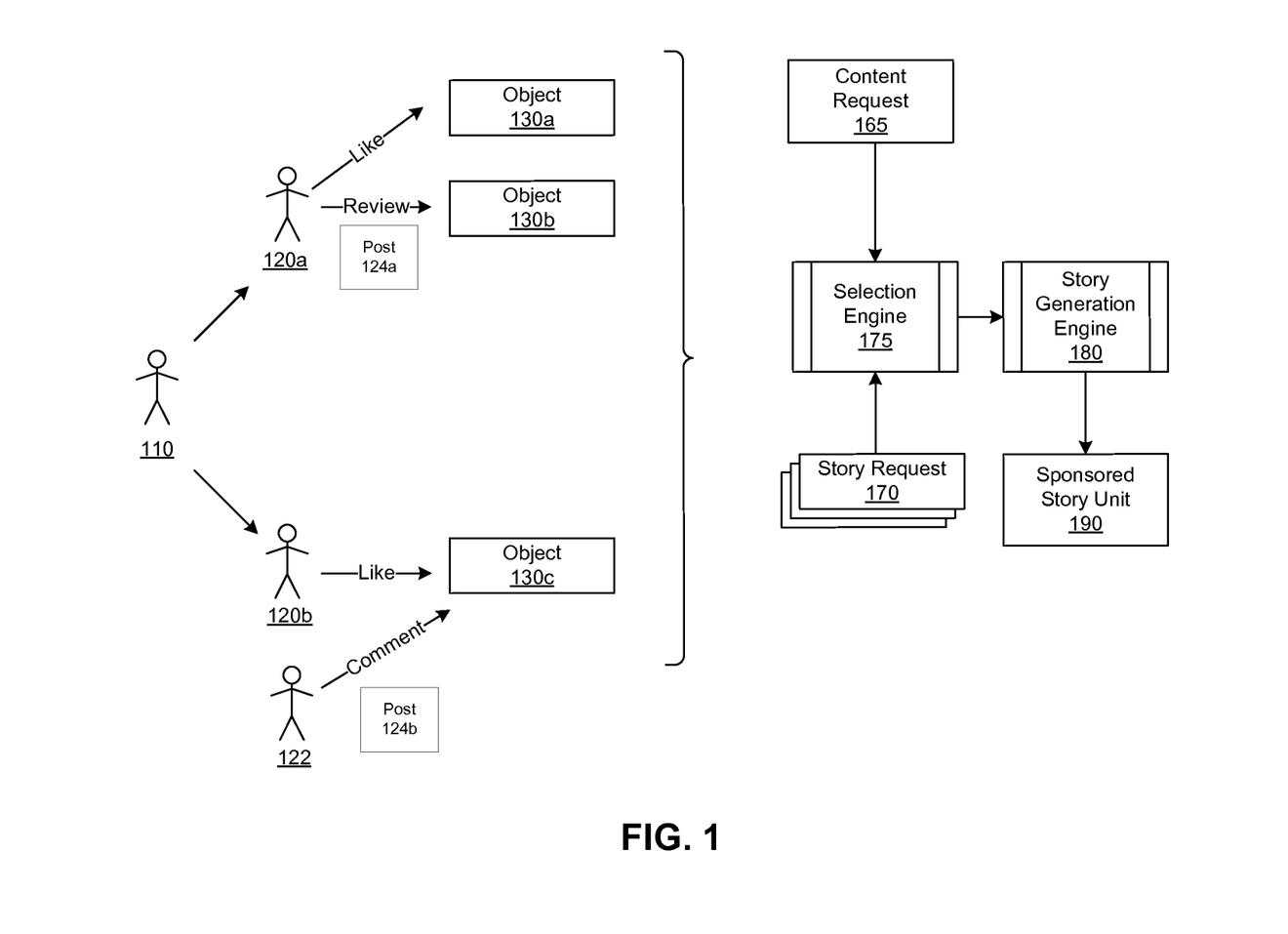
FIG. 1 is a diagram of a process for generating a sponsored story unit, in accordance with an embodiment of the invention.

FIG. 1 illustrates a process for generating a sponsored story unit 190. The process begins with a selection engine 175 receiving, from the viewing user 110, a request 165 for content (e.g., a webpage) with which a sponsored story unit is to be presented. Upon receiving the content request, the selection engine 175 selects a story request 170 to serve as the basis for a sponsored story unit. The selected story request 170 can be chosen from a set of story requests received from one or more advertisers, where each story request specifies an interaction (e.g., a "like" interaction, a "talking about" interaction, posting a comment, etc.) that is to be featured in the sponsored story unit. In order to select a specific story request, the selection engine 175 determines, for each story request in the set, whether one or more of the viewing user's friends 120 have performed the interaction specified in the story request.

Based on this determination, the selection engine 175 selects a specific story request 170 to serve as the basis for the sponsored story unit, where the selected story request specifies an interaction that one or more of the viewing user's friends 120 have performed. For example, a specific story request 170 may request that a sponsored story unit 190 feature a "like" type interaction involving the object 130c. Because the viewing user's friend 120b has "liked" the object 130c, the selection engine 175 may select the specific story request 170 to serve as the basis for the story 190.

Following selection, a story generation engine 180 identifies one or more candidate posts 124. The candidate posts 124 can each be associated with the object 130 involved in the interaction specified by the selected story request. A candidate post 124 may be associated with an object 130 if, for example, the post had previously been posted to the object. It should be appreciated that a candidate post need not be generated by a friend 120 of the viewing user 110. Illustratively, the post 124b can be a candidate even though it is generated by the user 122 with whom the viewing user 110 is not connected. After identifying the one or more candidate posts 124, the story generation engine 180 selects at least one of the posts to be included in the sponsored story unit 190. The story generation engine 180 thereafter generates the sponsored story unit 190, which includes a description of the specified interaction (i.e., the sponsored story) and the selected at least one candidate post. The generated sponsored story unit 190 may optionally include an input element that enables the viewing user 110 to interact with the story.

System Architecture

Figure 2A:
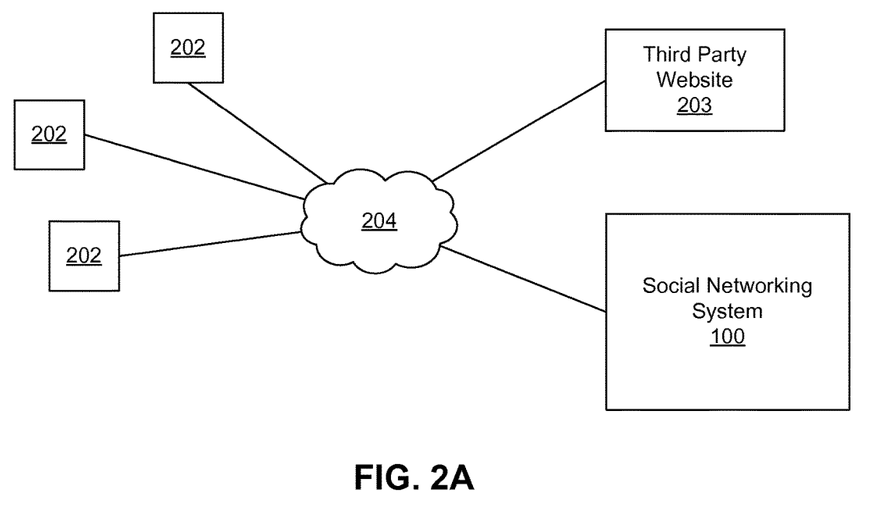
FIG. 2A is a high level block diagram illustrating a system environment suitable for operation of a social networking system, in accordance with an embodiment of the invention.

FIG. 2A is a high level block diagram illustrating a system environment suitable for operation of a social networking system 100. The system environment includes one or more client devices 202, one or more third-party websites 203, a social networking system 100, and a network 204. While only three client devices and one third-party website are shown in FIG. 2A, it should be appreciated that any number of these entities (including millions) can be included. In alternative configurations, different entities can also be included in the system.

The network 204, in general, can be any network, including but not limited to any combination of the Internet, a mobile network, a LAN, a wired or wireless network, a private network, and/or a virtual private network.

The client devices 202 include one or more computing devices that can receive user input and can transmit and receive data via the network 204. For example, the client devices 202 may be desktop computers, laptop computers, tablet computers (pads), smart phones, personal digital assistants (PDAs), or any other device including computing functionality and data communication capabilities. The client devices 202 are configured to communicate via network 204, which may include any combination of local area and/or wide area networks, using both wired and wireless communication systems. The client devices 202 can provide a means by which various users can communicate with the social networking system 100. The third party website 203 is coupled to the network 204 in order to communicate with the social networking system 100.

The social networking system 100 includes a computing system that allows users to communicate or otherwise interact with each other and access content as described herein. In one embodiment, the social networking system 100 stores user profiles that describe the users of a social network, including biographic, demographic, and other types of descriptive information, such as work experience, educational history, hobbies or preferences, location, and the like. The social networking system 100 additionally stores other objects, such as fan pages, events, groups, advertisements, general postings, etc.

Figure 2B:
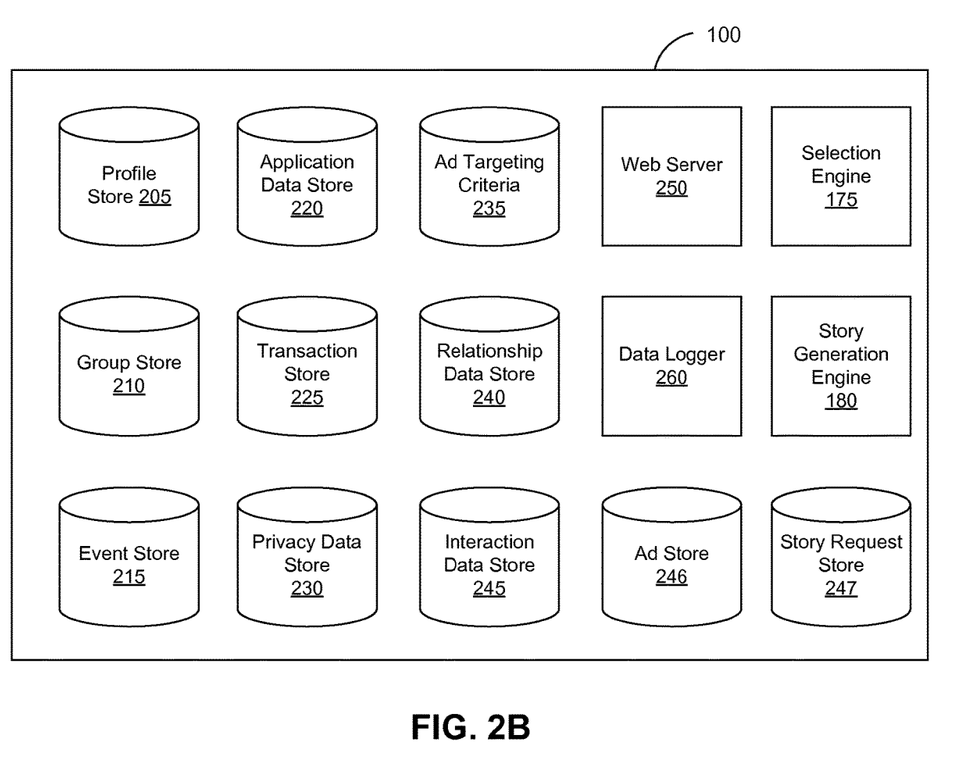
FIG. 2B is a block diagram of various components of a social networking system, in accordance with an embodiment of the invention.

FIG. 2B is an example block diagram of various components of the social networking system 100. The social networking system 100 includes a web server 250, a data logger 260, a selection engine 175, a story generation engine 180, a profile store 205, a group store 210, an event store 215, an application data store 220, a transaction store 225, a privacy data store 230, ad targeting criteria 235, relationship data store 240, an interaction data store 245, an ad store 246, and a story request store 247. In alternative configurations, different components can be included in the system 100.

In general, the web server 250 links the social networking system 100 via the network 204 to one or more of the client devices 202, as well as to one or more third party websites 203. The web server 250 may include a mail server or other messaging functionality for receiving and routing messages between the social networking system 100 and the client devices 202 or third party websites 203. The messages can be instant messages, queued messages (e.g., email), text and SMS messages, or any other suitable messaging technique. In one embodiment, the web server 250 can receive user requests for content, where a sponsored story unit is to be provided with the content. In response, the web server 250 may send a request for a sponsored story unit to the selection engine 175.

The data logger 260 is capable of receiving communications from the web server 250 regarding the different interactions users may have with a number of different types of social networking objects in the social networking system 100. The social networking system 100 can maintain such data in any suitable manner. In one embodiment, each of the profile store 205, the group store 210, the event store 215, the application data store 220, the transaction store 225, the privacy data store 230, the relationship data store 240, the interaction data store 245, the ad store 246, and the story request store 247 store data structures to manage the data for each instance of a corresponding type of social networking object maintained by the system 100. The data structures include information fields that are suitable for the corresponding type of object. (For example, the event store 215 contains data structures that include the time and location for an event, whereas the profile store 205 contains data structures with fields suitable for describing a user's profile).

When a new object of a particular type is created, the system 100 initializes a new data structure of the corresponding type, assigns a unique object identifier to it, and begins to add data to the object as needed. This might occur, for example, when a new story request is received from an advertiser, where the system 100 would generate a new instance of a story request in the story request store 247, assign a unique identifier to the story request, and populate the story request with information defining a requested sponsored story unit.

The selection engine 175 selects a story request to serve as the basis for a sponsored story unit in response to a request for a sponsored story unit received from the web server 250. In one embodiment, the selection engine 175 can retrieve a number of story requests from the story request store 247. The story requests may have been previously received by the social networking system 100 from advertisers, advertising brokers, and/or the like. Each story request can indicate an interaction to be reported by a sponsored story included in a sponsored story unit, where the interaction involves a particular social networking object 130. For example, a story request may specify that a sponsored story of the sponsored story unit include information regarding a "like" type interaction involving a particular company's fan page. Each story request can additionally include other parameters for defining a sponsored story unit. For instance, a story request can indicate the types of posts (e.g., comments, reviews, etc.) that may be included in the story, whether an input element is to be included, information for any questions to be presented, any additional content to be included, any associated advertisements to be presented, etc. Illustratively, a story request may indicate, among other things, a specific question to be asked in the sponsored story unit and that an input element is to be included in the story to enable the viewing user to answer the question.

Based on the retrieved story requests, the selection engine 175 identifies a set of candidate story requests. In particular, for each story request, the selection engine 175 determines whether at least one of the viewing user's friends 120 has performed the interaction specified in the story request. Those story requests that specify interactions that which the viewing user's friends 120 have performed can be considered candidate story requests. For example, a story request may specify that a "like" interaction be performed on a particular fan page. The story request may be considered a candidate if at least one of the viewing user's friends has "liked" the specified fan page. After identifying the candidate story requests, the selection engine 175 selects a specific story request 170 to serve as the basis for the sponsored story unit. The selection engine 175 can select the story request in any suitable manner. In one embodiment, the selection engine 175 selects the story request with the highest expected value. The expected value can be computed as a function of a per-click bid price for the sponsored story unit (as provided by an advertiser) weighted by an estimated probability that the sponsored story unit will be clicked by the viewing user 110. To estimate the probability that the viewing user 110 will click on a sponsored story unit, the selection engine 175 computes this probability as a weighted function of the viewing user's affinities for the object 130 involved in the interaction and/or the friend 120 that performed the interaction.

The story generation engine 180 generates a sponsored story unit based on a selected story request. In generating the sponsored story unit 190, the story generation engine 180 identifies a set of candidate posts. Each candidate post can be associated with the social networking object 130 involved in the interaction specified by the selected story request. For example, a selected story request 170 can specify that the sponsored story unit 190 is to feature an interaction with a particular fan page. As such, a comment published to the same fan page would be identified as a candidate post. As discussed previously, a candidate post can be generated by any suitable user, including users who are not connected with the viewing user 110.

After identifying the set of candidate posts, the story generation engine 180 selects one or more posts from the set. In one embodiment, the story generation engine 180 selects the one or more posts based on how recently the post was generated. More specifically, the story generation engine 180 can select the posts that were most recently associated with the social networking object 130. For example, the story generation engine 180 can select the most recent comment to a company's fan page.

In another embodiment, the story generation engine 180 selects the one or more posts based on the user engagement values for the posts. Specifically, the story generation engine 180 can select the one or more posts with the highest user engagement values among the candidate posts. The user engagement value for a given post can be measured in any suitable manner. For example, the user engagement value may be measured based on the number of users who have viewed the post. More specifically, a post may be determined to have a high user engagement value if the post has been viewed a relatively large amount of times. As another example, the user engagement value can be measured based on the user-perceived quality of the post. In particular, a post may be determined to have a high user engagement value if the post has been "liked" by a relatively large number of users.

In still another embodiment, the story generation engine 180 selects the one or more posts based on the friend coefficients associated with the posts. More specifically, the story generation engine 180 can select the one or more posts associated with the highest friend coefficients among the candidate posts. The friend coefficient associated with a given post can be measured in any suitable manner. For example, the friend coefficient for the post can be based on the number of interactions between the viewing user 110 and the user that generated the post. In particular, the post may be associated with a relatively high friend coefficient if the user that generated the post has interacted with the viewing user 110 (e.g., posting on the viewing user's profile, receiving messages from the viewing user, etc.) a relatively large number of times.

In yet another embodiment, the story generation engine 180 selects the one or more posts based on the content of the posts. In one aspect, the story generation engine 180 can identify matches between text in a post and text in the viewing user's profile. For example, the post may reference a particular company's product. The viewing user's profile may also reference the same product. As a result, the story generation engine 180 may select the post. In another aspect, the story generation engine 180 can match a concept within a post with a concept in the viewing user's profile. As an example, a post may reference a particular company's product. The viewing user's profile may reference a different product of the same product category. Because both the post and the user's profile reference products of the same category, the story generation engine 180 may select the post.

It should be appreciated that methods for selecting a specific post can be combined in any suitable manner. For example, in selecting the one or more posts, the story generation engine 180 can consider both user engagement values and friend coefficients for the posts. In such an embodiment, the story generation engine 180 can weigh the selection techniques differently or equally in selecting the one or more posts.

The number of posts selected by the story generation engine 180 can be based on any suitable criteria. For example, a sponsored story unit may have certain screen or space constraints as indicated by, for example, the user request 165 and/or the selected story request 170. As such, the number of posts selected by the story generation engine 180 can be a number that enables the sponsored story unit to meet any imposed constraints. In one embodiment, two or more of the selected posts can be related. For example, a first selected post may be an image uploaded by a retailer to its fan page. A second selected post may be a comment posted by the user discussing the uploaded image.

After selecting the at least one post to be included in the sponsored story unit 190, the story generation engine 180 generates the sponsored story unit 190. The generated sponsored story unit 190 includes a sponsored story describing the specific interaction between at least one of the viewing user's friends 120 and the selected social networking object 130. For example, the sponsored story may indicate that two of the viewing user's friends 120 have "liked" the fan page of a certain company. The sponsored story unit further includes the selected one or more related posts. For example, the sponsored story unit can include two different comments posted to the company's fan page. The generated sponsored story unit 190 can further include additional information stored in the social networking system, such as the name and a picture of the at least one of the viewing user's friends 120, links to the user profile of the at least one friend, questions and/or other content specified in the selected story request, etc.

In one embodiment, the sponsored story unit can optionally include an input element. The input element enables the viewing user 110 to interact with the sponsored story unit. For example, the viewing user 110 can use the input element to post a comment discussing the sponsored story unit. As another example, the viewing user 110 can use the input element to comment on his or her friend's interaction (e.g., "liking") described in the sponsored story unit. As yet another example, the viewing user 110 can use the input element to provide a comment regarding a post included in the sponsored story unit. For instance, the viewing user 110 can provide a comment regarding a user uploaded image included in the sponsored story unit.

The input element can include any suitable mechanism for enabling an input to be received from the viewing user 110. For example, the input element can include a text field, a set of radio buttons, a set of checkboxes, a dropdown menu, a button or set of buttons, etc. As another example, the input element can include a mechanism by which audio and/or video can be received from the user. For example, the input element can include a mechanism for receiving a video stream from a video capture device (e.g., a camera).

In one embodiment, the input element can be associated with a question or prompt in the sponsored story unit. The question or prompt may have been defined as part of the selected story request. The input element can provide a means for the question or prompt to be answered. For example, a set of radio buttons may be included in the sponsored story unit to enable the viewing user to answer a question regarding his or her opinion of a fan page referenced by the story.

After generating the sponsored story unit 190, the generation engine 180 can provide, for display, the story unit 190. The generated sponsored story unit 190 can be displayed to the viewing user 110 as a newsfeed story, a banner, an interactive pop-up, or in association with an application associated with the social networking system executing on the client 202. In one embodiment, the generated sponsored story unit 190 can be paired with an advertisement. In particular, the story request selected for the sponsored story unit 190 may have indicated that a particular advertisement be displayed with the sponsored story unit. As a result, the generation engine 180 can retrieve the indicated advertisement from the ad store 246. Thereafter, the advertisement can be presented with the sponsored story unit. In one embodiment, the advertisement and sponsored story unit may be formatted such that they appear as a single unit. In another embodiment, the advertisement and sponsored story unit may be presented on the same page, but not be formatted to appear as a single unit.

In one embodiment, after providing the sponsored story unit to the viewing user, the social networking system 100 can receive information from the viewing user 110 via the optional input element of the sponsored story unit. In one embodiment, the viewing user's interaction with the input element and the received information can be posted to the newsfeeds of the viewing user's friends, associated with the social networking object featured in the sponsored story unit, etc. The interaction and the received information can additionally be stored in the various stores of the social networking system 100. The interaction can be later used as the basis for sponsored stories that are presented to the viewing user's friends. For example, the viewing user 110 may provide a comment to a first sponsored story unit. Thereafter, the social networking system 100 may provide a second sponsored story unit to one of the viewing user's friends. The second sponsored story unit may indicate that the viewing user 110 has interacted with the first sponsored story unit. The second sponsored story unit presented to the friend can additionally include the comment provided by the viewing user 110 via the input element.

Figure 3:
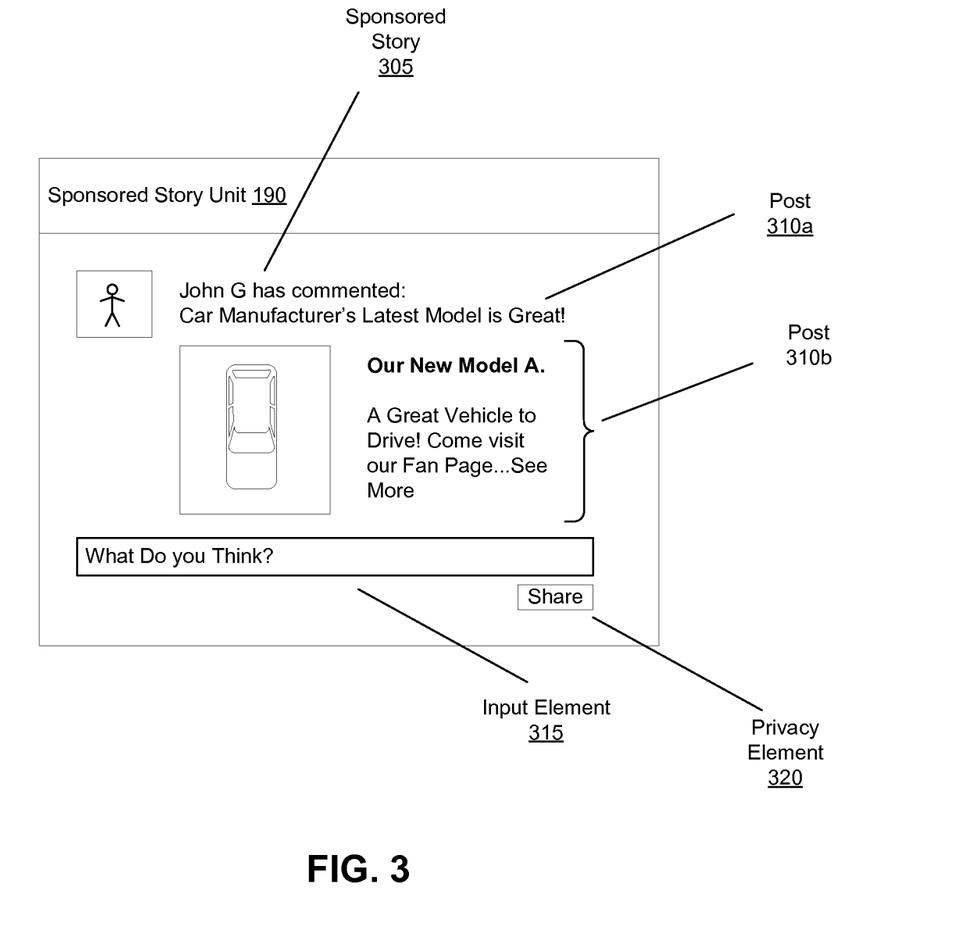
FIG. 3 illustrates an exemplary sponsored story unit, in accordance with an embodiment of the invention.

FIG. 3 illustrates an exemplary sponsored story unit 190. As shown in FIG. 3, the sponsored story unit includes sponsored story 305, post 310a, post 310b, input element 315, and privacy element 320. The sponsored story 305 indicates the specific interaction that the viewing user's friend has performed. In particular, the sponsored story indicates that the viewing user 110's friend 120 has commented on the fan page for a car manufacturer. The sponsored story unit further includes the post 310a posted by the viewing user 110's friend to the fan page of the car manufacturer. The sponsored story unit additionally includes post 310b posted to the fan page by the car manufacturer. In particular, the post 310b includes an image and a page description previously posted to the fan page by the car manufacturer. The sponsored story unit 190 moreover includes an input element 315 and a corresponding question that can be answered by the viewing user 110. The sponsored story unit additionally includes a privacy element 320. The privacy element can enable the viewing user 110 to limit the use of his or her interaction with and/or information provided via the input element. For example, the viewing user 110 can indicate that the interaction and/or information provided via the input element not be shared with others. As a result, sponsored story units presented to other users would not report the interaction and/or information provided by the viewing user 110 via the input element.

Method for Generating Sponsored Story Units

Figure 4:
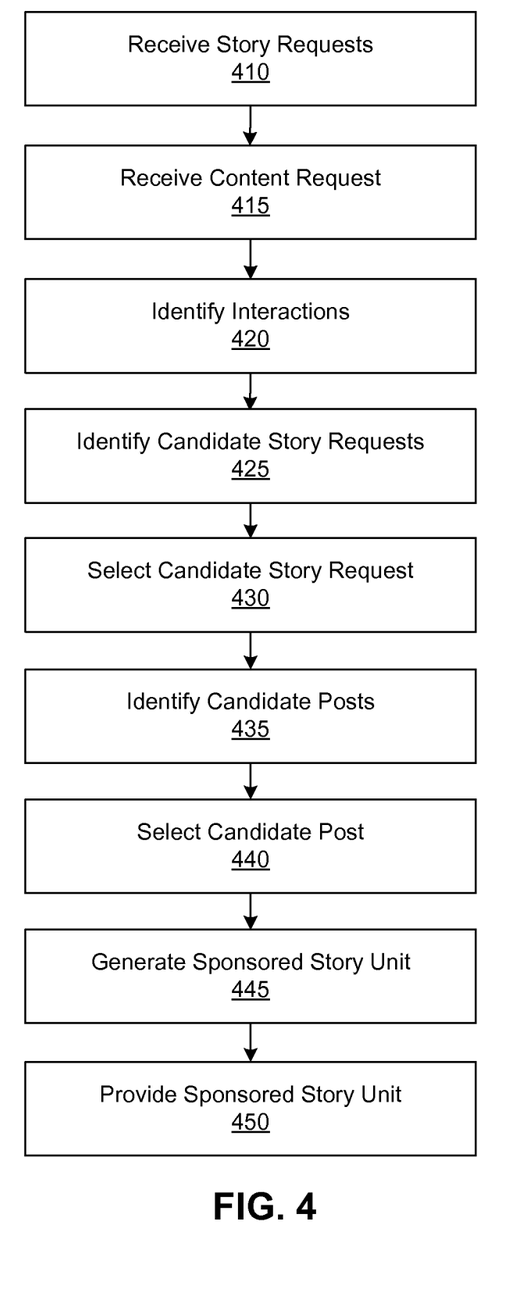
FIG. 4 is a flow chart of a process for providing a sponsored story unit to a user of a social networking system, in accordance with an embodiment of the invention.

FIG. 4 illustrates one embodiment of a process in which the social networking system generates a sponsored story unit. In one embodiment, the process receives 410 a number of story requests. Each story request can define the specific parameters for a sponsored story unit. For example, each story request can include information specifying a particular interaction to be included in the story, whether an input element is to be included, any questions that are to be asked, etc. The received story requests can be stored in the story request store 247. The process receives 415 a request for content from a viewing user 110, where the content is to be presented with a sponsored story unit. The process then identifies 420 one or more interactions performed by the viewing user's friends on one or more social networking objects 130. The process thereafter identifies 425 one or more candidate story requests. In particular, the process retrieves the received story requests from the story request store 247. Thereafter, the process determines, for each story request, whether one or more of the viewing user's friends 120 have performed the interaction specified in the story request. Those story requests that specify interactions that one or more of the viewing user's friends 120 have performed can be considered candidate requests. From the candidate requests, the process selects 430 a story request to serve as the basis for the sponsored story unit.

Following the selection, the process identifies 435 one or more candidate posts 124. The candidate posts 124 can each be associated with the object 130 involved in the interaction specified by the selected story request. It should be appreciated that a candidate post need not be generated by a friend 120 of the viewing user 110. The candidate post only is required to be associated with the object 130. After identifying the one or more candidate posts 124, the process selects 440 at least one of the posts to be included in the sponsored story unit. The process can select the one or more candidate posts 124 in any suitable manner. For example, the process can select the one or more candidate posts 124 based on how recently the posts were published, the user engagement values for the posts, the friend coefficients associated with the posts, and/or matches between the posts and the viewing user's profile. Following selection of the one or more candidate posts, the process generates 445 the sponsored story unit 190, which includes a description of the specified interaction (i.e., the sponsored story) and the selected one or more candidate posts. The generated sponsored story unit 190 may optionally include an input element that enables the viewing user 110 to interact with the story. Following generation of the sponsored story unit, the process provides 450 the sponsored story unit, for display, to the viewing user 110.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, from a plurality of advertisers, a plurality of story requests, each story request generated by an advertiser of the plurality of advertisers and each story request including an identifier that specifies one type of interaction of a plurality of types of interactions that can be performed by users having a connection to a viewing user on a pre-existing object in a social network that is associated with the advertiser;
identifying a plurality of interactions that are performed by users having a connection to the viewing user in a social networking system, each interaction of the plurality of interactions involving a corresponding pre-existing object in the social networking system;
performing a first search among the plurality of story requests to find a selected story request that has the identifier that specifies the type of interaction that matches one of the plurality of identified interactions;
performing a second search within the social network for one or more user-generated candidate posts that have a connection in the social networking system with the corresponding pre-existing object involved in one of the plurality of identified interactions, wherein the one of the identified interactions matches the type of interaction identified in the selected story request;

selecting at least one post from the one or more candidate posts;

generating, based on the indicator in the selected story request found in the first search, a sponsored story unit that comprises (1) content describing the one of the plurality of identified interactions performed by the user having the connection to the viewing user and (2) selected at least one user-generated post found in the second search; and transmitting the sponsored story unit for display to a client device of the viewing user.

2. The method of claim 1, wherein the connection between the at least one post and the corresponding pre-existing object in the social network was previously established via the at least one post being posted to the pre-existing object in the social network.

3. The method of claim 1, wherein the at least one selected post is provided by a user different from the user who performed the at least one interaction corresponding to the type of interaction specified in the selected story request.

4. The method of claim 3, wherein the user who provided the at least one selected post is not connected to the viewing user.

5. The method of claim 1, wherein the sponsored story unit further comprises an input element for receiving information from the viewing user.

6. The method of claim 5, further comprising:
receiving information from the viewing user via the input element; and
providing, to a user connected to the viewing user, another sponsored story unit for display, wherein the other sponsored story unit is based at least in part on the information received from the viewing user via the input element.

7. The method of claim 6, wherein the other sponsored story unit comprises (1) content describing the viewing user's interaction with the input element and (2) the information received via the input element.

8. The method of claim 1, wherein selecting a story request from the plurality of story requests comprises:
determining, for each of the plurality of story requests, an expected value of the story request based on an advertiser-provided bid price and an estimated probability that the viewing user will engage with a sponsored story unit corresponding to the story request; and
selecting the story request that has a highest expected value of the plurality of story requests.

9. The method of claim 1, wherein an estimated probability that the viewing user will engage with a sponsored story unit corresponding to a given story request is computed, the computation based on an affinity of the viewing user for a pre-existing object in the social networking system, corresponding to the given story request, with which a user connected to the viewing user has performed an interaction of an interaction type specified in the given story request.

10. The method of claim 1, wherein selecting the at least one post further comprises:
determining a user engagement value for each of the one or more posts; and
selecting a post having a highest user engagement value.

11. The method of claim 10, wherein the user engagement value for a post is based at least in part on a number of times that users of the social networking system have interacted with the post.

12. A non-transitory computer readable storage medium, storing computer readable instructions that when executed by a processor, causes the process to perform operations comprising:
receiving, from a plurality of advertisers, a plurality of story requests, each story request generated by an advertiser of the plurality of advertisers and each story request including an identifier that specifies one type of interaction of a plurality of types of interactions that can be performed by users having a connection to a viewing user on a pre-existing object in a social network that is associated with the advertiser;

identifying a plurality of interactions that are performed by users having a connection to the viewing user in a social networking system, each interaction of the plurality of interactions involving a corresponding pre-existing object in the social networking system;

performing a first search among the plurality of story requests to find a selected story request that has the identifier that specifies the type of interaction that matches one of the plurality of identified interactions;

performing a second search within the social network for one or more user-generated candidate posts that have a connection in the social networking system with the corresponding pre-existing object involved in one of the plurality of identified interactions, wherein the one of the identified interactions matches the type of interaction identified in the selected story request;

selecting at least one post from the one or more candidate posts;

generating, based on the indicator in the selected story request found in the first search, a sponsored story unit that comprises (1) content describing the one of the plurality of identified interactions performed by the user having the connection to the viewing user and (2) selected at least one user-generated post found in the second search; and transmitting the sponsored story unit for display to a client device of the viewing user.

13. The non-transitory computer readable storage medium of claim 12, wherein the connection between the at least one post and the corresponding pre-existing object in the social network was previously established via the at least one post being posted to the pre-existing object in the social network.

14. The non-transitory computer readable storage medium of claim 12, wherein the at least one selected post is provided by a user different from the user who performed the at least one interaction corresponding to the type of interaction specified in the selected story request.

15. The non-transitory computer readable storage medium of claim 14, wherein the user who provided the at least one selected post is not connected to the viewing user.

16. The non-transitory computer readable storage medium of claim 12, wherein the sponsored story unit further comprises an input element for receiving information from the viewing user.

17. The non-transitory computer readable storage medium of claim 16, storing further computer-readable instructions, that when executed by the processor, cause the processor to perform operations comprising:
receiving information from the viewing user via the input element; and providing, to a user connected to the viewing user, another sponsored story unit for display, wherein the other sponsored story unit is based at least in part on the information received from the viewing user via the input element.

18. The non-transitory computer readable storage medium of claim 17, wherein the other sponsored story unit comprises (1) content describing the viewing user's interaction with the input element and (2) the information received via the input element.

19. The non-transitory computer readable storage medium of claim 12, storing further computer-readable instructions for selecting a story request from the plurality of story requests, that when executed by the processor, cause the processor to perform operations comprising:
  determining, for each of the plurality of story requests, an expected value of the story request based on an advertiser-provided bid price and an estimated probability that the viewing user will engage with a sponsored story unit corresponding to the story request; and
  selecting the story request that has a highest expected value of the plurality of story requests.

20. The non-transitory computer readable storage medium of claim 12, wherein an estimated probability that the viewing user will engage with a sponsored story unit corresponding to a given story request is computed, the computation based on an affinity of the viewing user for a pre-existing object in the social networking system, corresponding to the given story request, with which a user connected to the viewing user has performed an interaction of an interaction type specified in the given story request.

21. The non-transitory computer readable storage medium of claim 12, wherein selecting the at least one post further comprises:
  determining a user engagement value for each of the one or more posts; and
  selecting a post having a highest user engagement value.

22. The non-transitory computer readable storage medium of claim 21, wherein the user engagement value for a post is based at least in part on a number of times that users of the social networking system have interacted with the post.

* * * * *